United States Patent [19]
Bassett

[11] Patent Number: 4,771,844
[45] Date of Patent: Sep. 20, 1988

[54] METHOD AND APPARATUS FOR COOLING A PRIME MOVER

[75] Inventor: James H. Bassett, St. Paul, Minn.

[73] Assignee: The Toro Company, Minneapolis, Minn.

[21] Appl. No.: 13,317

[22] Filed: Feb. 11, 1987

[51] Int. Cl.⁴ .............................................. B60K 11/04
[52] U.S. Cl. .................................. 180/68.1; 180/68.4
[58] Field of Search .................... 180/68.1, 68.2, 68.3, 180/68.4, 69.21, 69.22, 69.24

[56] References Cited

U.S. PATENT DOCUMENTS

| | | | |
|---|---|---|---|
| 3,796,277 | 3/1974 | Gordon | 180/68.3 |
| 3,857,453 | 12/1974 | Buttke et al. | 180/68.1 |
| 3,996,999 | 12/1976 | Termont et al. | 180/68.1 |
| 4,081,050 | 3/1978 | Hennessey et al. | 180/68.1 |
| 4,137,983 | 2/1979 | Gray | 180/69.24 |
| 4,573,544 | 3/1986 | Hoch et al. | 180/68.1 |

FOREIGN PATENT DOCUMENTS

| | | |
|---|---|---|
| 899909 | 12/1953 | Fed. Rep. of Germany . |
| 2913648 | 10/1980 | Fed. Rep. of Germany . |

OTHER PUBLICATIONS

Toro Brochure: Groundmaster 327 and Groundmaster 322-D, Form 85-68-T, Radiator & Hood Assembly form Groundmaster 322-D Parts Catalog, Form No. 3312-958.

*Primary Examiner*—David M. Mitchell
*Attorney, Agent, or Firm*—R. Lawrence Buckley

[57] ABSTRACT

A turf maintenance apparatus (10) having a cooling system. The cooling system includes a front-facing air inlet (42) which delivers air to a longitudinal duct (100) running along the length of the turf maintenance machine (10). A flow reverser (120) is located at the downstream end of the longitudinal duct (100) and serves to turn the flow roughly 180° into a rear-facing radiator (80). The air inlet screen (42) is preferably located immediately behind the operator's seat (40), in a region which is substantially devoid of grass clippings. The preferred turf maintenance machine (10) thus has its power take off (PTO) located near cutting reels (22, 24) and has the air inlet for its cooling system located in a region which is relatively clean and readily serviced by the operator.

3 Claims, 3 Drawing Sheets

METHOD AND APPARATUS FOR COOLING A PRIME MOVER

TECHNICAL FIELD

The invention pertains generally to apparatus having prime movers. More particularly, the invention involves powered implements, and methods and apparatus for cooling the prime movers of powered implements.

BACKGROUND OF THE INVENTION

Apparatus of the type having prime movers which require cooling are well known. Such apparatus would include various types of transportation vehicles, tractors and other agricultural equipment and implements, excavating equipment, and turf maintenance machines. Typically, the prime mover would be an internal combustion engine which could be selectively coupled to traction drive wheels and perhaps also to powered tools, either mechanically or through a hydraulic system. The present invention generally involves cooling systems for such apparatus. The invention will be described solely in terms of turf maintenance machines, but those skilled in the art will recognize that the invention is applicable to a wide variety of machines and implements.

Turf maintenance machines, particularly relatively large commercial machines, generally include a frame; a prime mover mounted on the frame, typically fore-and-aft; wheels supporting the frame, some or all of which are selectively coupleable through a transmission to the prime mover; a power take-off (PTO) extending from one end of the prime mover; a radiator adjacent the other end of the prime mover; and various tools, e.g., turf cutting units, operatively connectable to the PTO, often through a hydraulic system. If a hydraulic system is indeed used to power the working tools, a hydraulic fluid cooler or radiator can be mounted on the frame adjacent to the main (prime mover) radiator.

As is well known, vehicles such as automobiles typically include a cooling system which includes has a radiator for exchanging heat between a liquid coolant and the ambient air; a water pump for causing the coolant to flow between the prime mover and the radiator; and a thermostat for allowing fluid communication between the radiator and the prime mover when necessary. While a liquid coolant cooling system is useful in transportation vehicles, such a system is absolutely necessary for turf maintenance equipment wherein the prime mover drives the traction wheels, and also supplies power to the working tool(s), often through a hydraulic system. Some turf maintenance machines have tools which derive their power from frictional engagement with the ground as the traction vehicle traverses same. Other maintenance machines include tools which are directly powered by the prime mover independent of the traction wheels. In either case, waste heat must be dissipated into air passing through a radiator. However, as those skilled in the art of turf maintenance equipment recognize, the environment in which turf maintenance equipment must function renders this task difficult: grass clippings in particular tend to clog radiators and flow passages associated therewith. This being the case, turf maintenance equipment manufacturers usually recommend that equipment operators periodically check the radiator and/or radiator covers or screens to insure that minute air passageways are open.

Some manufacturers also include warning lights and/or temperature gauges which are designed to warn of overheating problems and signal the operator to remove grass clippings from the radiator and associated passageways.

As noted above, the prime mover of a typical piece of turf maintenance equipment has a PTO at one end and a radiator (and perhaps a hydraulic fluid heat exchanger) adjacent at the other end. Given this arrangement, various design configurations have been implemented. Referring to the attached Drawings, FIGS. 1-4 show, somewhat diagrammatically, various design configurations for turf maintenance equipment. In particular, FIG. 1 illustrates a fairly standard tractor pulling a gang of hydraulically-powered mowing reels. The reels are coupled, mechanically or hydraulically, to a PTO extending from the rearward end of the prime mover. A radiator is located at the front of the traction vehicle with a fan situated between the prime mover and the radiator suitable for drawing ambient air through the radiator. Of course, one or more drive wheels of the traction vehicle are also coupled to the prime mover through a transmission.

While the configuration illustrated in FIG. 1 is quite satisfactory for some applications, it is often preferable to locate the working tools toward the front of the vehicle. One popular form of turf maintenance equipment is a gang mower, wherein several lawn mowing units, e.g., reels, are held in spaced positions in transverse rows of one or more units so that their swaths overlap and so that the units are individually free to adapt themselves to the undulations of the ground. Gang lawn mower can include, for example, three or five mowing units disposed in two transverse rows. It is useful to have the cutting units adjacent to or in front of the operator so that he can easily observe the units and readily judge and control the degree of lap of the cuts of the outside units of the gang with the previous cut, and so that he can always see when any unit is not properly operating, whatever the reason.

In view of the desirability of having the cutting units forward of the operator, several alternative configurations have been suggested. One such configuration is shown diagrammatically in FIG. 2. In this design, the radiator is again located at the forwardmost end of the traction vehicle and the PTO faces the rear of the vehicle. However, in this case the working tools are located forward of the radiator and are coupled to the PTO through a lengthy mechanical or hydraulic system. Due to the distance between the PTO and the working tools, fairly high mechanical or hydraulic losses can result. Moreover, grass clippings thrown upward by the cutting units and entrained by the cooling air can collect on the radiator or the screen covering the radiator. Thus, the operator is often put to the inconvenience of having to stop the traction vehicle simply to remove grass clippings from the radiator screen. Due to the inconvenience of this maintenance operation, many operators will tend to wait until the temperature warning light indicates that the prime mover is overheating. If the warning light should cease to function or function intermittently, overheating can damage the prime mover or associated components.

Thus, still another configuration has been tried, and FIG. 3 illustrates this third design. Here, the radiator is located toward the rearward end of the traction vehicle and the PTO is located near the front end of the vehicle. With this design, there is a shorter distance between the PTO and the cutting units, which of course is advantageous. Also, since the radiator is farther away from the cutting units, one might assume that it should not as readily plug with grass clippings. However, the rear-mounted radiators of such units do indeed tend to quickly plug with grass clippings, presumably because the grass clippings are churned upward by the rear wheels of the traction vehicle or perhaps simply because clippings are thrown upward and over the top of the traction vehicle by the cutting units themselves. Some manufacturers have mitigated the plugging problems associated with this design by elevating the air inlet to a more clipping-free area. While this technique tends to create less clipping blockage, the radiator screen is still located toward the back of the machine, an area often ignored by the operator: since the working units (e.g., reels) and controls are situated toward the front of the vehicle, operators will often forget to check the radiator or radiator screen for plugging problems.

Given these problems, still another configuration has been offered. FIG. 4 shows this configuration. Here, the cutting units are located toward the front of the traction vehicle and the PTO is located toward the rear of the vehicle. Hydraulics are conveniently used to couple the PTO and the cutting units. An important feature of this design is that the radiator and the intake for same are located immediately behind the operator. Experience has shown that this area is often the cleanest area of the entire machine, i.e., and the area least likely to be subjected to airborne grass clippings. Also, the operator can very easily check, on a regular basis, to determine whether the intake screen has plugged, and if it has, can easily remove the grass clippings from the screen. Such a turf maintenance machine is sold by The Toro Company, assignee herein, under the designation GROUNDSMASTER 72 ®. Since the radiator is situated in a substantially grass-free area, it is less likely to plug; if plugging occurs or is imminent, the operator simply reaches over and wipes the grass clippings off the screen without stopping the cutting operation. While this design is therefore excellent in many respects, it still places the PTO quite some distance from the cutting units, resulting in unnecessary hydraulic losses and expense. Further, this design places the radiator fan immediately behind the operator. The sound level associated with such fans can be quite objectionable, particularly at close range. In fact, some European nations have stringent noise regulations which might totally preclude the use of this design.

The present invention addresses the problems associated with the cooling systems of prior art turf maintenance equipment (and other equipment, machines and implements having prime movers). In particular, the present invention includes a method and apparatus for cooling a prime mover which allows the PTO and the cooling air inlet to be on the same end of the prime mover. Thus, the cooling air inlet can be adjacent and behind the operator's seat (in a substantially clipping-free area); the PTO can be positioned acceptably close to the working tools; and the working tools can be located toward the front of the vehicle for ready observation by the operator.

SUMMARY OF THE INVENTION

Accordingly, the present invention includes, in one embodiment, an air ducting system for a powered implement having a prime mover; a PTO located at one end of the prime mover; and a radiator located at the other end of the prime mover, the ducting system including:

(a) a longitudinal air duct adjacent the prime mover, wherein during operation of the air ducting system air flows in a first direction therethrough;

(b) an air inlet proximate the PTO in fluid communication with the longitudinal air duct; and (c) flow reversing means proximate to and in fluid communication with the radiator and the longitudinal air duct for receiving air from the air duct, causing the air to flow in a second direction substantially opposite the first direction, and directing the air through the radiator.

The invention also includes an entire cooling system for a powered implement, the cooling system including a radiator and the air ducting system recited above. Still another embodiment is an entire powered implement including such a cooling system.

In a broad sense, the invention is a method which includes the steps of drawing cooling air through an air inlet proximate the PTO of a prime mover; ducting the cooling air in a first direction longitudinally along the prime mover; and reversing the flow of air so that the air flows in a second direction substantially opposite the first direction and through a radiator located at the end of the prime mover opposite from the PTO.

In a narrower sense, the invention includes various features. For example, the longitudinal air duct referred to above can be formed by an enclosure for a prime mover and radiator. The enclosure can include a stationary radiator enclosure and a relatively moveable prime mover enclosure. The longitudinal air duct can actually be divided into two ducts located on either side of the prime mover. A flow reverser proximate the radiator turns the flow of air issuing from the longitudinal ducts toward and into a rear-facing radiator. A preferred flow reverser has a "double-humped" shape suitable for receiving flow from two substantially parallel longitudinal air ducts and directing the flow into the radiator.

Preferably, the "powered implement" referred to above is a self-propelled riding lawn mower.

BRIEF DESCRIPTION OF THE DRAWINGS

The invention will be further described with reference to the Drawings wherein.

DETAILED DESCRIPTION OF THE INVENTION

Figure 1:
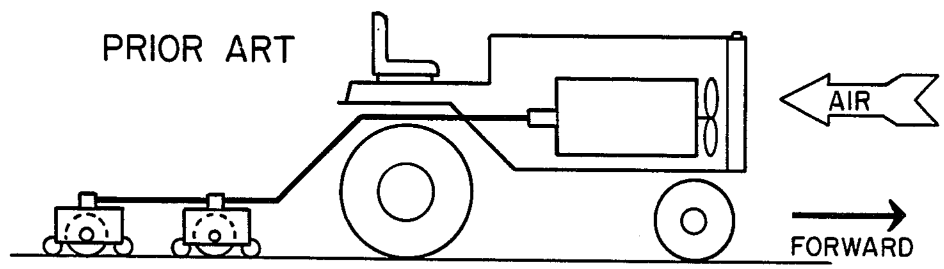
FIG. 1 diagrammatically illustrates a prior art turf maintenance apparatus having a front radiator, a rear PTO and rear mowing reels.
Figure 2:
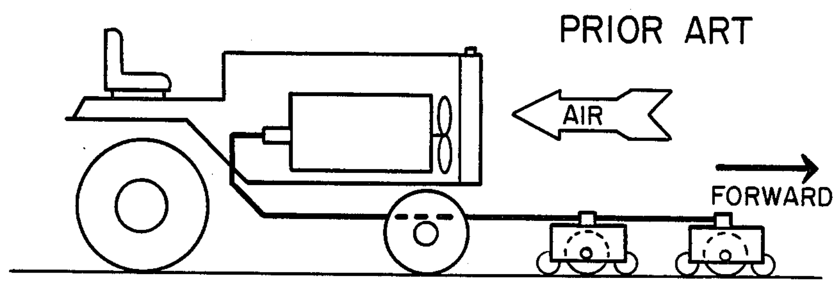
FIG. 2 diagrammatically illustrates a prior art turf maintenance apparatus having a front radiator, rear PTO and front cutting reels.
Figure 3:
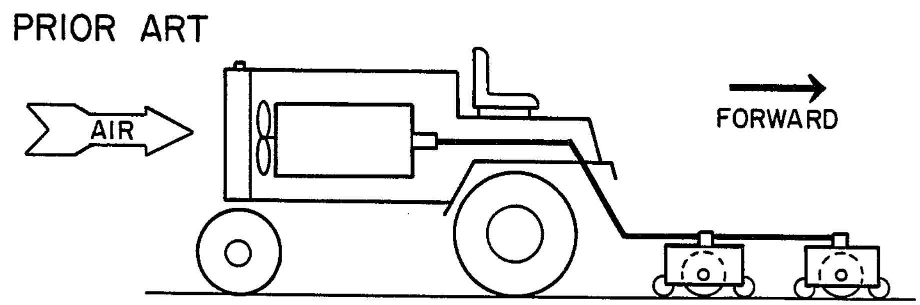
FIG. 3 diagrammatically illustrates a prior art turf maintenance apparatus having a rear radiator, front PTO and front cutting reels coupled thereto.
Figure 4:
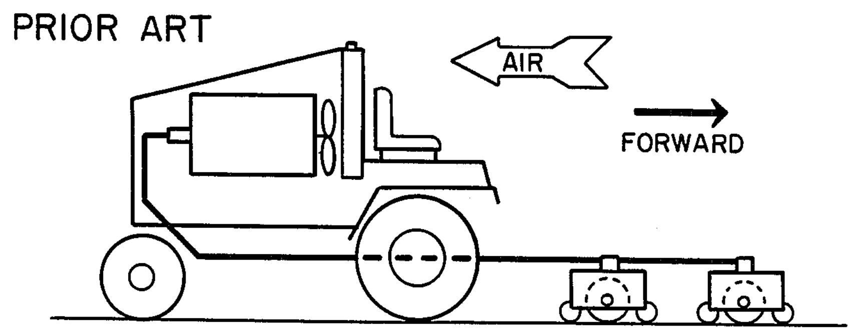
FIG. 4 illustrates a prior art turf maintenance apparatus having a radiator located immediately behind the operator's seat, a rear PTO and front cutting reels.
Figure 5:
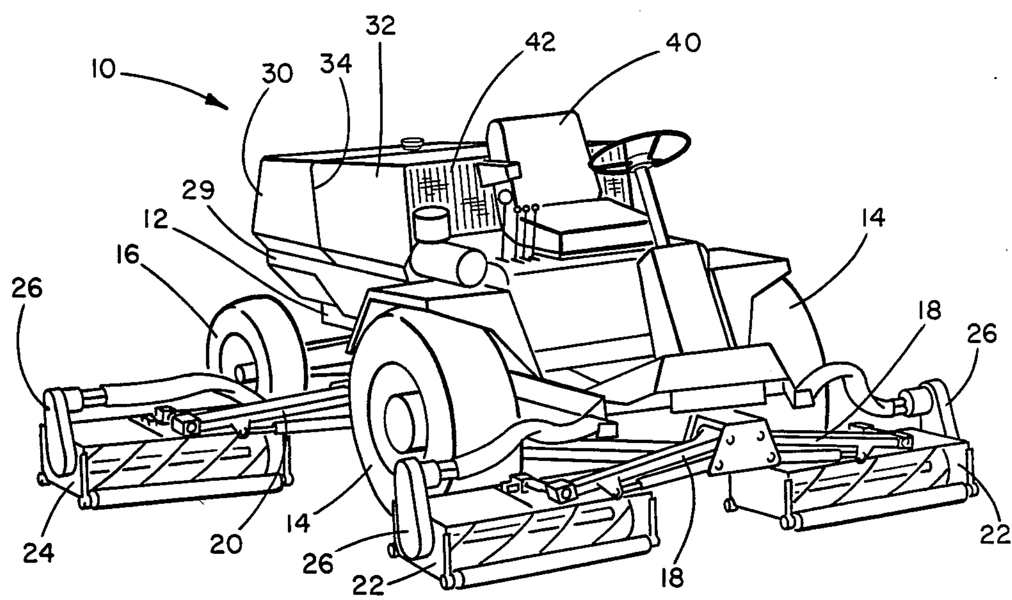
FIG. 5 is a perspective view of a turf maintenance apparatus according to the present invention.

Referring to the Drawings, wherein like reference numerals designate like parts and assemblies throughout the several views, FIG. 5 shows a perspective view of a preferred turf maintenance machine 10 according to the invention. Machine 10 includes a chassis 12 preferably made of precision welded high strength tubular steel. Operatively coupled to chassis 12 is a pair of front drive wheels 14 appropriately coupled to a transmission (not shown). A pair of rear steerable wheels 16 support the rearward end of chassis 12.

Turf maintenance machine 10 can be used in a variety of turf maintenance capacities, e.g., mowing and dethatching. Hydraulically-powered tools are operatively connected to chassis 12 for these purposes. A pair of front tool-supporting arms 18 are hingedly connected to the front central portion of chassis 12. Similarly, a pair of side tool-supporting arms 20 are hingedly connected to chassis 12 proximate its longitudinal mid-point and extend laterally therefrom. A reel unit 22 is coupled to each front arm 18 through a U-joint connection which permits reel units 22 to individually follow ground undulations. A side reel unit 24 is coupled to each side arm 20, also through the use of a U-joint. A center reel (not shown) located centrally between wheels 14 and 16 is included to cut the strip of grass left between front reels 22 and to cut a swath which overlaps the swaths created by front reels 22.

Each reel unit 22, 24 includes a reel unit hydraulic motor 26 which is fluidly coupled to a hydraulic pump (not shown) which in turn is mechanically connected to the PTO which extends from the front of the prime mover. The PTO is preferably located roughly between front wheels 14 so that hydraulic connections can be easily made to the motors 26. By minimizing the distance between the hydraulic pump and hydraulic motors 26, fluid frictional losses are kept to a minimum, which means that a smaller pump can be used and that the hydraulic fluid temperature will tend to stay within the operating limit.

Rigidly attached to chassis 12 is a substantially U-shaped sheet steel lower body section 29 which is closed at the back and open at the front. One "face" of the U-shaped lower body 29 is attached to the upper surface of chassis 12 whereas one "face" carries a rear enclosure 30 which is preferably formed from sheet steel and is attached to lower body 29 in a conventional manner. Hingedly connected to rear enclosure 30 is a substantially U-shaped front enclosure 32, the hinge points being located toward the top surfaces of enclosures 30, 32 such that front enclosure 32 horizontally pivots upward and rearward relative to the rear enclosure 30. Thus, a separable seam or joint 34 exists between enclosures 30 and 32 and seam 34 is sealed using a resilient gasket. Front enclosure 32 covers a prime mover 50 and rests on lower body 29 with a resilient seal separating the two sheet metal components.

A seat 40 is situated atop chassis 12 and toward the forward end of same so that the operator can readily view the operation of reel units 22 and 24 and can readily observe the overlap between the swaths. Immediately behind seat 40 is a substantially vertical and planar perforated air inlet screen 42. Cooling air is drawn in through screen 42, as further discussed below. The close proximity of the air inlet screen 42 to seat 40 makes it very easy for the operator to continually monitor the screen to make sure that it does not become plugged with grass clippings. Moreover, the location of the screen 42 is such that it is unlikely to become plugged in any event, since the region around seat 40 tends to be substantially devoid of grass clippings during normal use.

Figure 6:
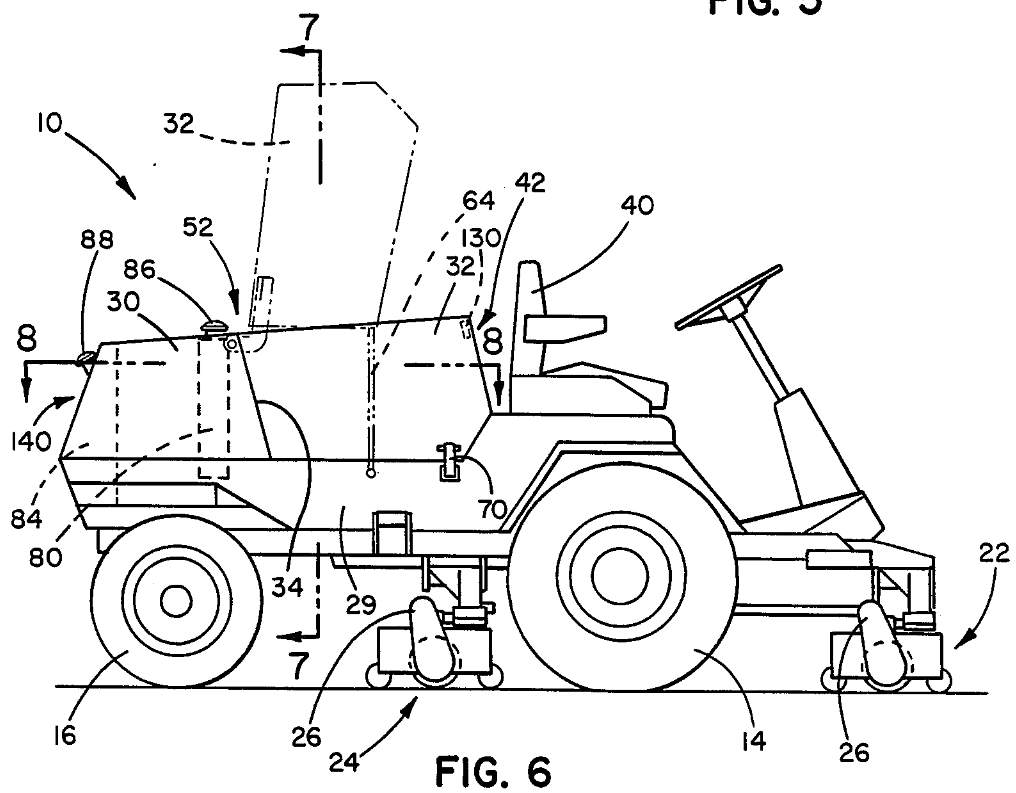
FIG. 6 is a side elevational view of the turf maintenance apparatus of FIG. 5.
Figure 7:
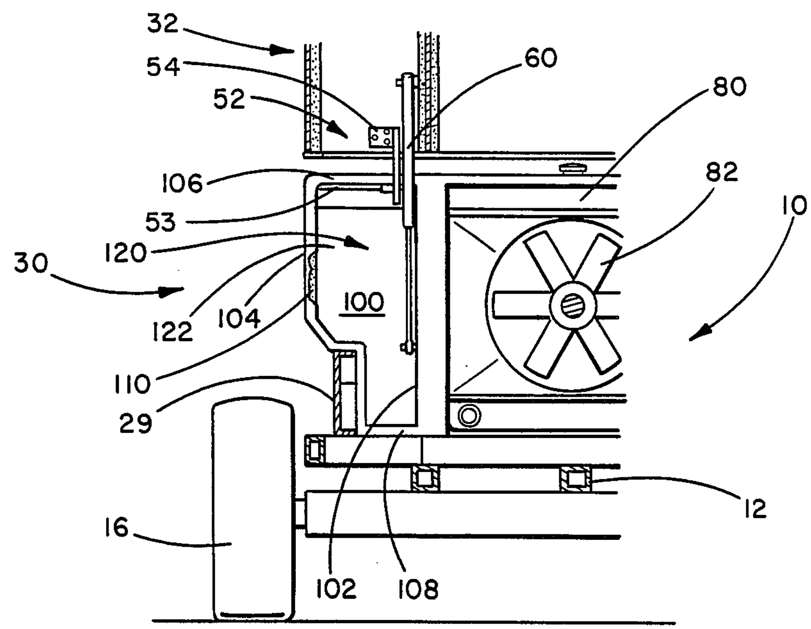
FIG. 7 is a transverse sectional view of the apparatus of FIG. 6 with the front enclosure ln its raised position, taken along line 7—7.
Figure 8:
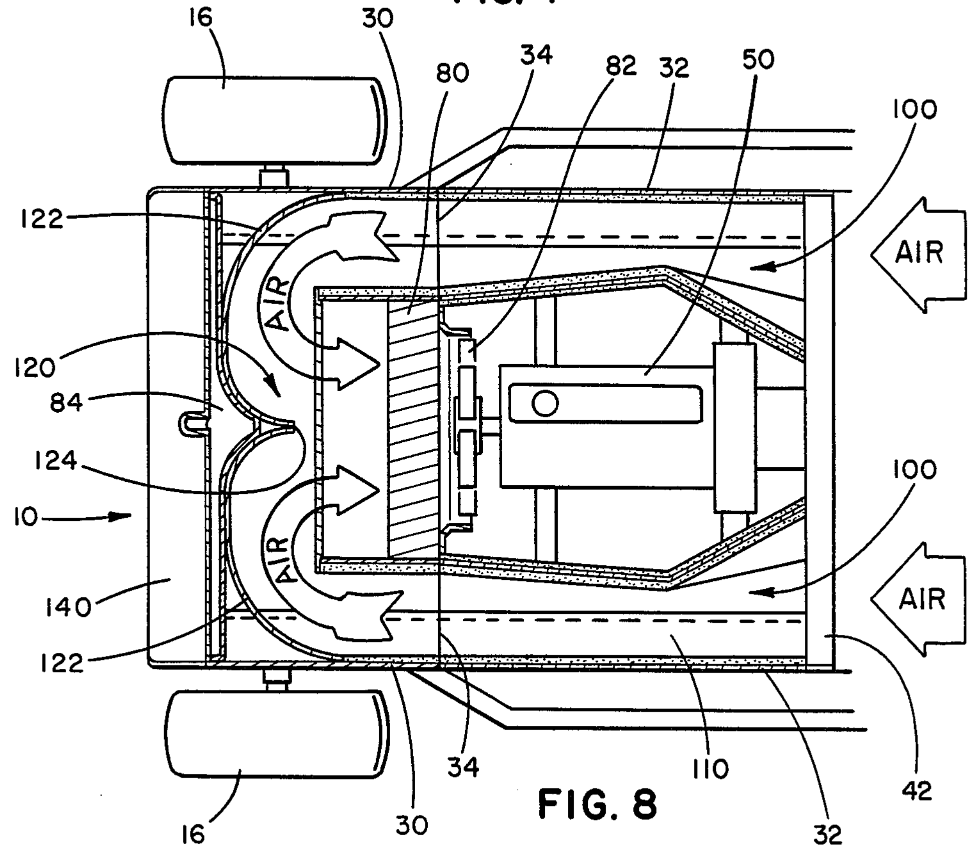
FIG. 8 is a longitudinal sectional view of the turf maintenance apparatus of FIG. 6 with the front enclosure in its lowered position taken along line 8—8.

FIG. 6 shows a side elevational view of turf maintenance machine 10. Front enclosure 32 is shown in its lowered position in solid line and in its raised position in phantom. A pair of hinges 52 pivotally couple enclosures 30 and 32. As shown in FIGS. 7 and 8, a pair of horizontally-positioned round hinge pins 53 span rear enclosure 30 adjacent to and immediately beneath its top surface, and a pair of hinge plates 54 bolted to front enclosure 32 rotatably receive the round hinge pins 53. When front enclosure 32 is raised, hinge plates 54 rotate about corresponding hinge pins 53.

A pair of gas springs 60 extend between rear and front enclosures 30 and 32 near seam 34. As shown in FIGS. 7 and 8, gas springs 60 are pivotally connected through a pair of studs 62 to the front enclosure 32 and also pivotally connected to the rear enclosure 30. Studs 62 are located toward the bottom of enclosure 32 (adjacent the surface which rests on lower body 29 when enclosure 32 is in its lowered position), whereas gas springs 60 connect to front enclosure 30 roughly midway between its top and bottom surfaces.

A steel rod brace 64 pivotally connected to lower body 29 can be selectively pivoted to support the front enclosure 32 in its raised position. When brace 64 is not in use, it can be latched to lower body 29. On each side of lower body 29, near the front of front enclosure 32, is attached an over-center clamp or latch 70. Latches 70 each include a handle portion and a catch portion and the catch portion of each latch 70 is received within an aperture formed on either side and toward the bottom of substantially U-shaped front enclosure 32. When turf maintenance machine 10 is being used, front enclosure 32 can be latched to lower body 29, a resilient seal being located therebetween.

As noted above, rear enclosure 30 surrounds a radiator 80 having a fan 82 and a fuel tank 84. Radiator 80 includes a radiator cap 86 and fuel tank 84 includes an upwardly extending fuel cap 88.

Reference is now made to FIG. 7 which shows a transverse sectional view of turf maintenance machine 10 with the front enclosure 32 in its raised position. This view illustrates a longitudinal duct 100 formed by rear enclosure 30. Duct 100 actually includes two mirror-image channels which run longitudinally along turf maintenance machine 10 on either side of prime mover 50. Only one of the mirror image channels is shown in FIG. 7; FIG. 8 shows both. Longitudinal duct 100 also extends through front enclosure 32 so that a continuous longitudinal duct 100 (actually a pair of mirror-image ducts) is formed by enclosures 30 and 32. Each longitudinal duct 100 includes a substantially vertical inner surface 102. Regarding the portion of longitudinal duct 100 which runs through front enclosure 32, inner surface 102 is adjacent to and encloses prime mover 50. Regarding the portion of longitudinal duct 100 which runs through rear enclosure 30, on the other hand, inner surface 102 is adjacent to and encases radiator 80 and fan 82.

Longitudinal duct 100 also includes a substantially vertical outer surface 104, a substantially horizontal top or upper surface 106 and a lower surface 108. Aluminized foam 110, roughly one-half inch thick, covers the outer and upper surfaces 104, 106. The surface of foam 110 against the sheet metal bears a pressure-sensitive adhesive, whereas the opposite face carries a thin aluminum layer for heat reflection. Similar foam covers the prime mover side of inner surface 102. Use of such foam keeps the temperature within longitudinal duct 100 relatively low compared to the temperature within the prime mover enclosure, so that the cooling air being ducted to the radiator is kept relatively cool and retains its maximum cooling capacity.

Located at the far downstream end of longitudinal duct 100, within rear enclosure 30, is a flow reverser 120 suitable for turning the air flowing through longitudinal duct 100 and directing it back toward the front of apparatus 10, through radiator 80. Applicant recognizes that the flow in duct 100 may not do a complete (180°) "U-turn" in reverser 120, but instead may only turn somewhere between 90° and 180°. However, for the sake of convenience the term "flow reverser" will be used. Flow reverser 120, as better shown in FIG. 8, includes a pair of curved U-shaped pieces 122 which are flush with outer surfaces 104.

As shown in FIG. 7, the cross section of longitudinal duct 100 is substantially rectangularly shaped. The height of longitudinal duct 100 is approximately 17 inches whereas the width of duct 100 at its maximum point is roughly 10 inches. The precise dimensions of duct 100 are not critical so long as the frictional losses induced by duct 100 are not too significant. That is, fan 82 must be adequate to draw cooling air through longitudinal duct 100 and flow reverser 120, and ultimately through radiator 80, at a sufficient flow rate to dissipate waste heat attributable to prime mover 50.

FIG. 8 shows a longitudinal sectional view of front and rear enclosures 32 and 30, respectively. This view illustrates the "double hump" appearance which results from the two curved U-shaped pieces 122 joining at the vertical mid-line of radiator 80. U-shaped pieces 122 are preferably seam welded at this line, the weld being designated with reference numeral 124 in the Drawings. The radius of curvature of each U-shaped piece 122 is preferably approximately 10 inches. Of course, other curved configurations could be used, and in fact it is not necessary that U-shaped pieces 122 be circular sections at all.

Air inlet screen 42, as noted above, is located immediately behind the operator's seat 40. Screen 42 is preferably situated substantially vertically at the front of longitudinal duct 100, i.e., at the front vertical face of front enclosure 32. Screen 42 preferably includes regularly spaced holes which are aggregately open enough to allow significant air flow, while at the same time being individually small enough to block grass clippings and other debris. Air inlet screen 42 is preferably magnetically connected to the front of front enclosure 32, so as to be easily removed for cleaning; as noted above, however, usually all that is necessary is for the operator to occasionally wipe off the front of screen 42 to remove grass clippings therefrom. A pair of magnets 130 at either upper end of screen 42 serves to connect screen 42 to front enclosure 32. There is also a foam strip located at the bottom of the front opening formed by front enclosure 32 suitable for supporting screen 42 to mitigate vibration-generated noise.

FIG. 8 also shows gas tank 84. As can be seen, gas tank 84 has, at its front surface, a double-hump shape which conforms to the shape formed by the U-shaped pieces 122. Of course, it is not necessary that gas tank 84 have this shape, but by having gas tank 84 assume this shape the maximum amount of fuel can be stored without unnecessarily lengthening turf maintenance machine 10. A sheet metal rear panel 140 is attached to the rearmost end of rear enclosure 30 using conventional means.

The operation of the cooling system can now be described. Normally, front enclosure 32 will be in its closed position with latches 70 holding the front enclosure 32 against lower body 29 and against rear enclosure 32. As indicated above, front enclosure 32 pivots about rear enclosure 30 through the use of hinge plates 54 and hinge pins 53, and a compressive seal is formed between front and rear enclosures 32 and 30 at seam 34. Thus, when front enclosure 32 is in its lowered position, continuous longitudinal duct 100 places air inlet screen 42 and flow reverser 120 in fluid communication. Each longigudinal duct 100 (one on each side of prime mover 50) terminates at its downstream end with associated U-shaped piece 122 which causes the cooling air to roughly make a U-turn into radiator 80. Fan 82, of course, acts to draw air through longitudinal duct 100, around reverser 120, and through radiator 80. Fan 82 must therefore have sufficient capacity to draw significant amounts of cooling air even when machine 10 is not moving forward. Those skilled in the art of engine cooling and fluid mechanics will recognize that the dimensions of longitudinal duct 100, the design of flow reverser 120 and the design and rotational speed of fan 82 must be selected to provide sufficient cooling air for the particular application. In the preferred turf maintenance machine 10 described above, between about 450 and 500 cfm are required to cool prime mover 50, preferably a 50 hp diesel engine, and the air-handling components are appropriately sized.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereto.

I claim:

1. In a powered implement having an operator seat; a prime mover; and a radiator for cooling the prime mover, an air ducting system comprising:

(a) a longitudinal air duct adjacent the prime mover, wherein during operation of the air ducting system air flows in a first direction therethrough;

(b) an air inlet proximate the operator seat in fluid communication with the longitudinal air duct; and (c) flow reversing means proximate to and in fluid communication with the radiator and the longitudinal air duct for receiving air from the air duct, causing the air to flow in a second direction substantially opposite the first direction, and directing the air through the radiator, wherein:

(i) the longitudinal air duct comprises first and second parallel longitudinal channels on either side of the prime mover;

(ii) the flow reversing means comprises a first U-shaped channel in fluid communication with the first longitudinal channel and a second U-shaped channel in fluid communication with the second longitudinal channel;

(iii) the first and second U-shaped channels join proximate the center line of the radiator to form a double-humped configuration, wherein each longitudinal channel and its associated U-shaped channel carry a separate air stream from the air inlet to the radiator, whereby the separate air streams flowing through the separate longitudinal channels and associated U-shaped channels join within the flow reversing means to flow through the radiator; and (iv) the implement comprises a rear enclosure surrounding the radiator and a front enclosure hingedly attached to the rear enclosure for selectively surrounding the prime mover, wherein the flow reversing means is formed by the rear enclosure and the longitudinal air duct is formed by the front enclosure.

2. An air ducting system for a self-propelled riding lawn mower having a front end and a rear end; an operator seat proximate the implement front end; a prime mover having a PTO extending from the first end thereof proximate the mower front end; a radiator proximate a second end of the prime mover opposite the first end for cooling the prime mover; a fixed rear enclosure surrounding the radiator; and a front enclosure hingedly connected to the rear enclosure for surrounding the prime mover, the air ducting system comprising:

(a) first and second longitudinal air channels on either side of the prime mover running from the prime mover first end to the prime mover second end, wherein during operation of the air ducting system air flows from the first end to the second end in a first direction therethrough;

(b) an air inlet proximate the PTO and immediately behind the operator seat;

(c) a first U-shaped channel in fluid communication with the first longitudinal channel for receiving air from the first longitudinal channel and causing the air to flow in a second direction substantially opposite the first direction through the radiator; and (d) a second U-shaped channel in fluid communication with the second longitudinal channel for receiving air from the second longitudinal channel and causing the air to flow in a second direction substantially opposite the first direction through the radiator, wherein:

(i) the U-shaped channels each have a radius of about 10 inches and the U-shaped channels join proximate the center line of the radiator to form a double-humped configuration;

(ii) the longitudinal channels are formed by the front enclosure and the U-shaped channels are formed by the rear enclosure; and (iii) each longitudinal channel and its associated U-shaped channel carry a separate air stream from the air inlet to the radiator, whereby the separate air streams flowing through the separate longitudinal channels and associated U-shaped channels join within the flow reverser to flow through the radiator.

3. A cooling system for a self-propelled riding lawn mower having a front end and a rear end; an operator seat proximate the front end; a prime mover having a PTO extending from a first end thereof proximate the mover front end; a fixed rear enclosure; and a front enclosure hingedly connected to the rear enclosure for surrounding the prime mover, the cooling system comprising:

(a) a radiator proximate a second end of the prime mover opposite the first end thereof for cooling the prime mover, the radiator being surrounded by the fixed rear enclosure;

(b) first and second longitudinal air channels on either side of the prime mover running from the prime mover first end to the prime mover second end, wherein during operation of the air ducting system air flows from the first end to the second end in a first direction therethrough;

(c) an air inlet proximate the PTO and immediately behind the operator seat;

(d) a first U-shaped channel in fluid communication with the first longitudinal channel for receiving air from the first longitudinal channel and causing the air to flow in a second direction substantially opposite the first direction through the radiator; and (e) a second U-shaped channel in fluid communication with the second longitudinal channel for receiving air from the second longitudinal channel and causing the air to flow in a second direction substantially opposite the first direction through the radiator, wherein:

(i) the U-shaped channels each have a radius of about 10 inches and the U-shaped channels join proximate the center line of the radiator to form a double-humped configuration;

(ii) the longitudinal channels are formed by the front enclosure and the U-shaped channels are formed by the rear enclosure; and (iii) each longitudinal channel and its associated U-shaped channel carry a separate air stream from the air inlet to the radiator, whereby the separate air streams flowing through the separate longitudinal channels and associated U-shaped channels join within the flow reverser to flow through the radiator.

* * * * *